United States Patent
Cañete Martinez et al.

(10) Patent No.: US 11,777,861 B2
(45) Date of Patent: Oct. 3, 2023

(54) PROCEDURES FOR PACKET FLOW DESCRIPTION MANAGEMENT

(71) Applicant: Telefonaktiebolaget LM Ericsson (publ), Stockholm (SE)

(72) Inventors: Antonio Cañete Martinez, Madrid (ES); Miguel Angel Muñoz De La Torre Alonso, Madrid (ES); Jiehong Yang, Mölndal (SE); Tianmei Liang, Shanghai (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 186 days.

(21) Appl. No.: 17/441,811

(22) PCT Filed: May 10, 2019

(86) PCT No.: PCT/EP2019/062097
§ 371 (c)(1),
(2) Date: Sep. 22, 2021

(87) PCT Pub. No.: WO2020/192945
PCT Pub. Date: Oct. 1, 2020

(65) Prior Publication Data
US 2022/0191146 A1    Jun. 16, 2022

(30) Foreign Application Priority Data
Mar. 25, 2019   (EP) ................................. 19382205

(51) Int. Cl.
*H04L 47/2483* (2022.01)
*H04W 76/22* (2018.01)
(Continued)

(52) U.S. Cl.
CPC ...... *H04L 47/2483* (2013.01); *H04L 47/2475* (2013.01); *H04M 15/66* (2013.01); *H04W 4/24* (2013.01); *H04W 76/22* (2018.02)

(58) Field of Classification Search
CPC .......... H04L 47/2483; H04L 47/2475; H04W 76/22; H04W 4/24; H04M 15/66
(Continued)

(56) References Cited

U.S. PATENT DOCUMENTS

| | | | |
|---|---|---|---|
| 2020/0145876 A1* | 5/2020 | Dao | H04W 28/06 |
| 2021/0014778 A1* | 1/2021 | Xi | H04W 8/26 |
| 2021/0289390 A1* | 9/2021 | Zhou | H04L 47/20 |

OTHER PUBLICATIONS

3GPP, "3rd Generation Partnership Project; Technical Specification Group Services and System Aspects; Procedures for the 5G System; Stage 2 (Release 15)", 3GPP TS 23.502 V15.5.0, Mar. 2019, pp. 1-355.
3GPP, "3rd Generation Partnership Project; Technical Specification Group Core Network and Terminals; Nu reference point between SCEF and PFDF for sponsored data connectivity (Release 15)", 3GPP TS 29.250 V15.0.0, Jun. 2018, pp. 1-20.
(Continued)

*Primary Examiner* — Obaidul Huq
(74) *Attorney, Agent, or Firm* — Murphy, Bilak & Homiller, PLLC

(57) ABSTRACT

Periodic requests for to Packet Flow Description, PFD, data updates on all Application Ids generate a constant background load in several network function nodes, even if applications have not been updated. There is provided a mechanism to optimize PFD management updates in a telecommunication network, whereby PFD data for a selected number of applications are stored and updated permanently, whilst PFD data for other applications are only temporarily stored so that storage and updates are released when these other applications are not in use. A list of
(Continued)

permanent Application Ids is configured for the most frequently used applications. When a control rule specifies an Application Id not included in the list of permanent Application Ids, the specified Application Id is included in a list of temporary Application Ids, which are periodically checked and, when not used, are removed from the list of temporary Application Ids.

20 Claims, 11 Drawing Sheets

(51) Int. Cl.
*H04L 47/2475* (2022.01)
*H04M 15/00* (2006.01)
*H04W 4/24* (2018.01)

(58) Field of Classification Search
USPC .................................................. 370/229, 235
See application file for complete search history.

(56) References Cited

OTHER PUBLICATIONS

3GPP, "3rd Generation Partnership Project; Technical Specification Group Core Network and Terminals; 5G System; Packet Flow Description Management Service; Stage 3 (Release 15)", 3GPP TS 29.551 V15.2.0,Dec. 2018, pp. 1-27.

3GPP, "3rd Generation Partnership Project; Technical Specification Group Services and System Aspects; Procedures for the 5G System; Stage 2 (Release 15)", 3GPP TS 23.502 V15.4.1, Jan. 2019, pp. 1-347.

3GPP, "3rd Generation Partnership Project; Technical Specification Group Services and System Aspects; System Architecture for the 5G System; Stage 2 (Release 15)", 3GPP TS 23.501 V15.1.0, Mar. 2018, pp. 1-201.

Ericsson, "Alignment and corrections in the use of terms such as identity, identifier, subscription, and subscriber", SA WG2 Meeting #122-Bis, S2-175438, (revision of S2-17xxxx), Sophia Antipolis, Aug. 21-25, 2017, pp. 1-10.

* cited by examiner

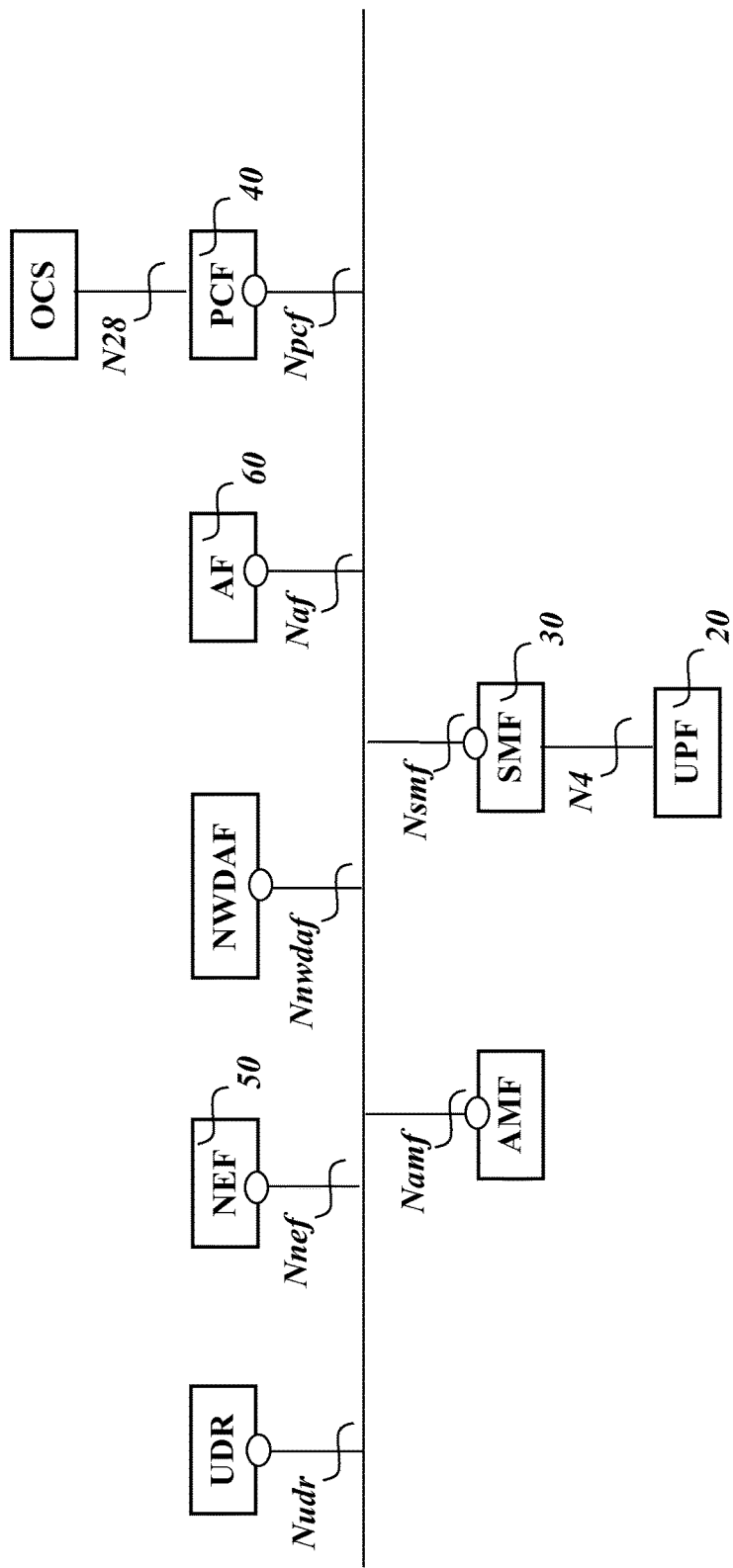
FIG. -1-

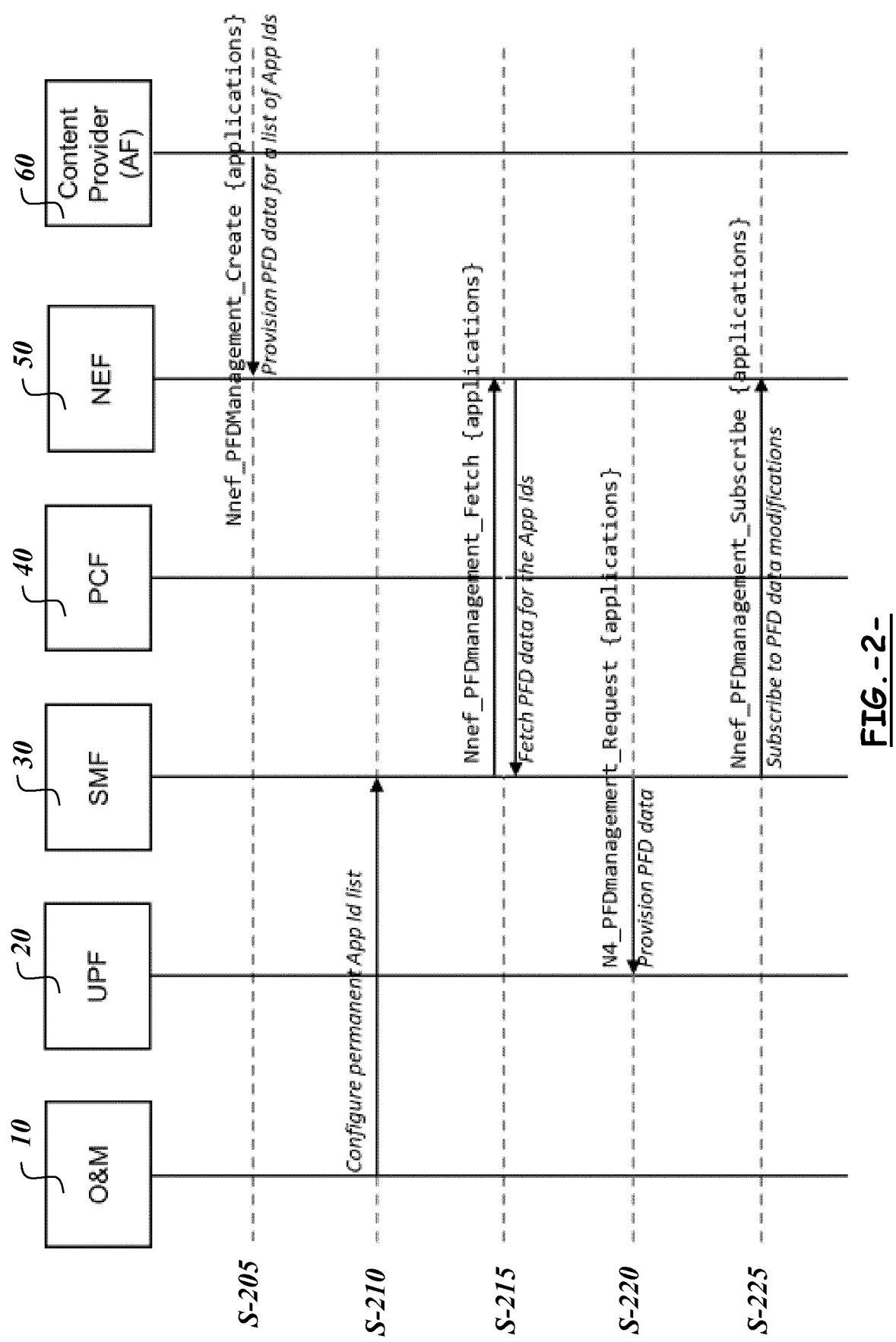
FIG. -2-

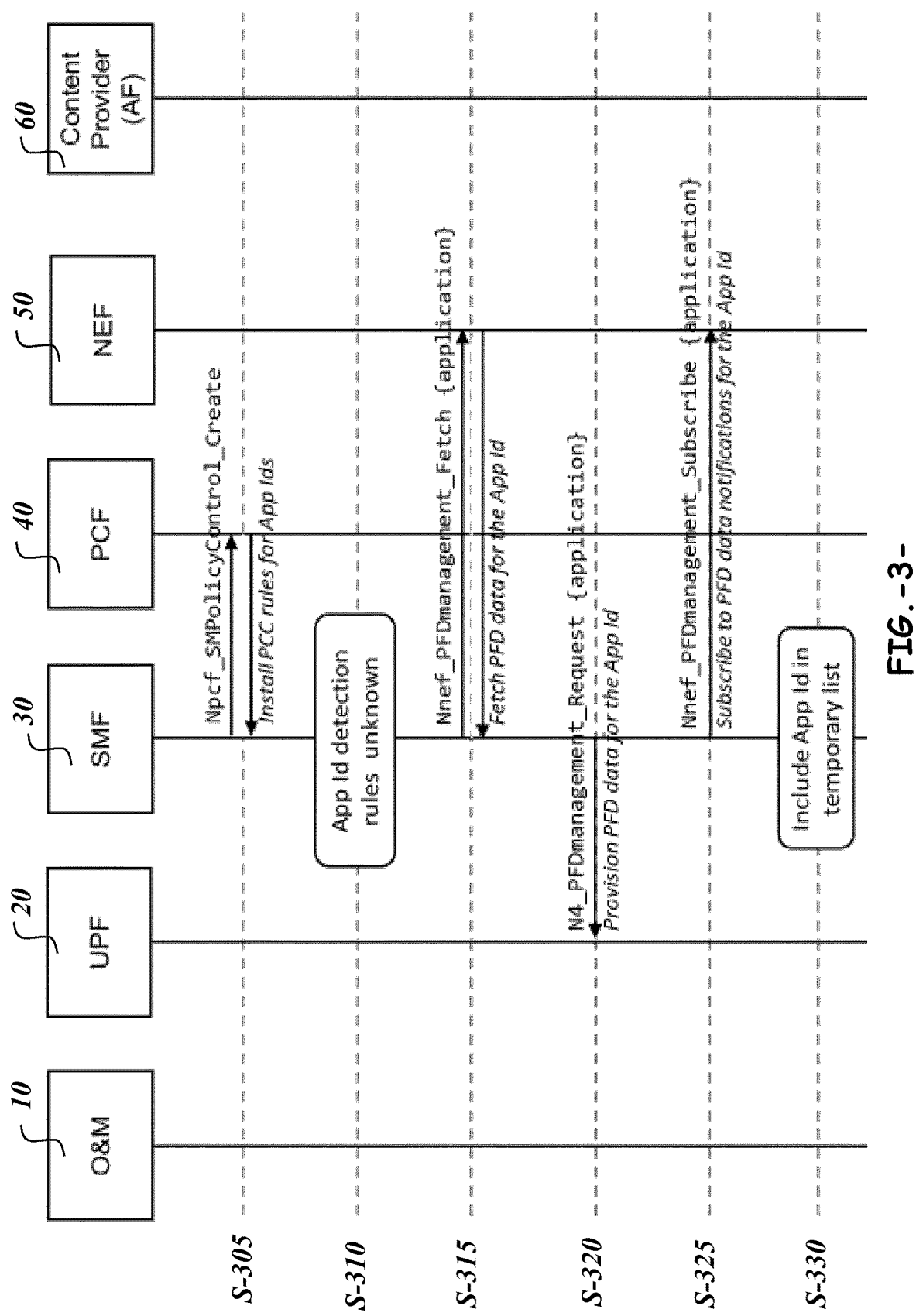

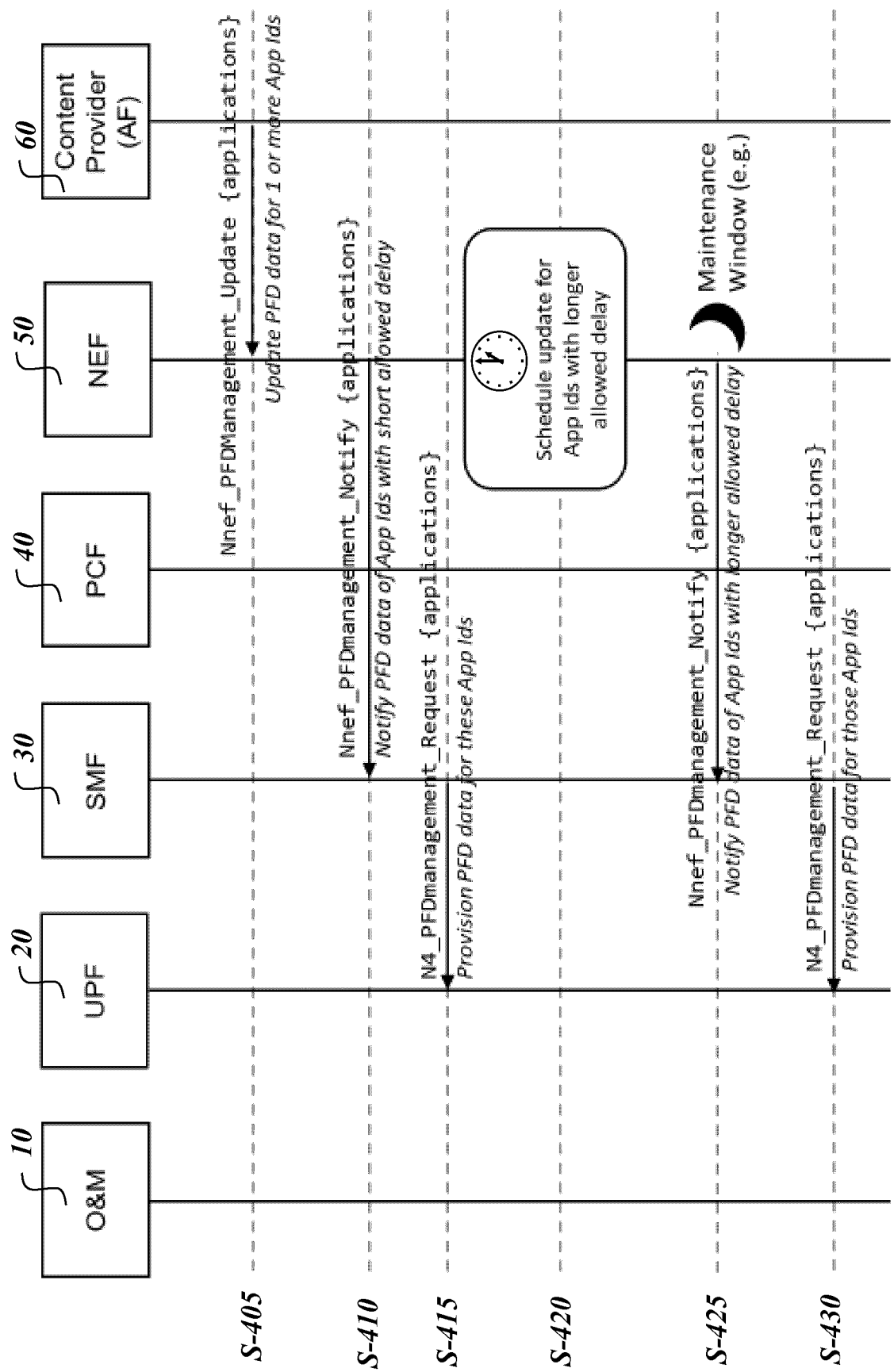
FIG. -4-

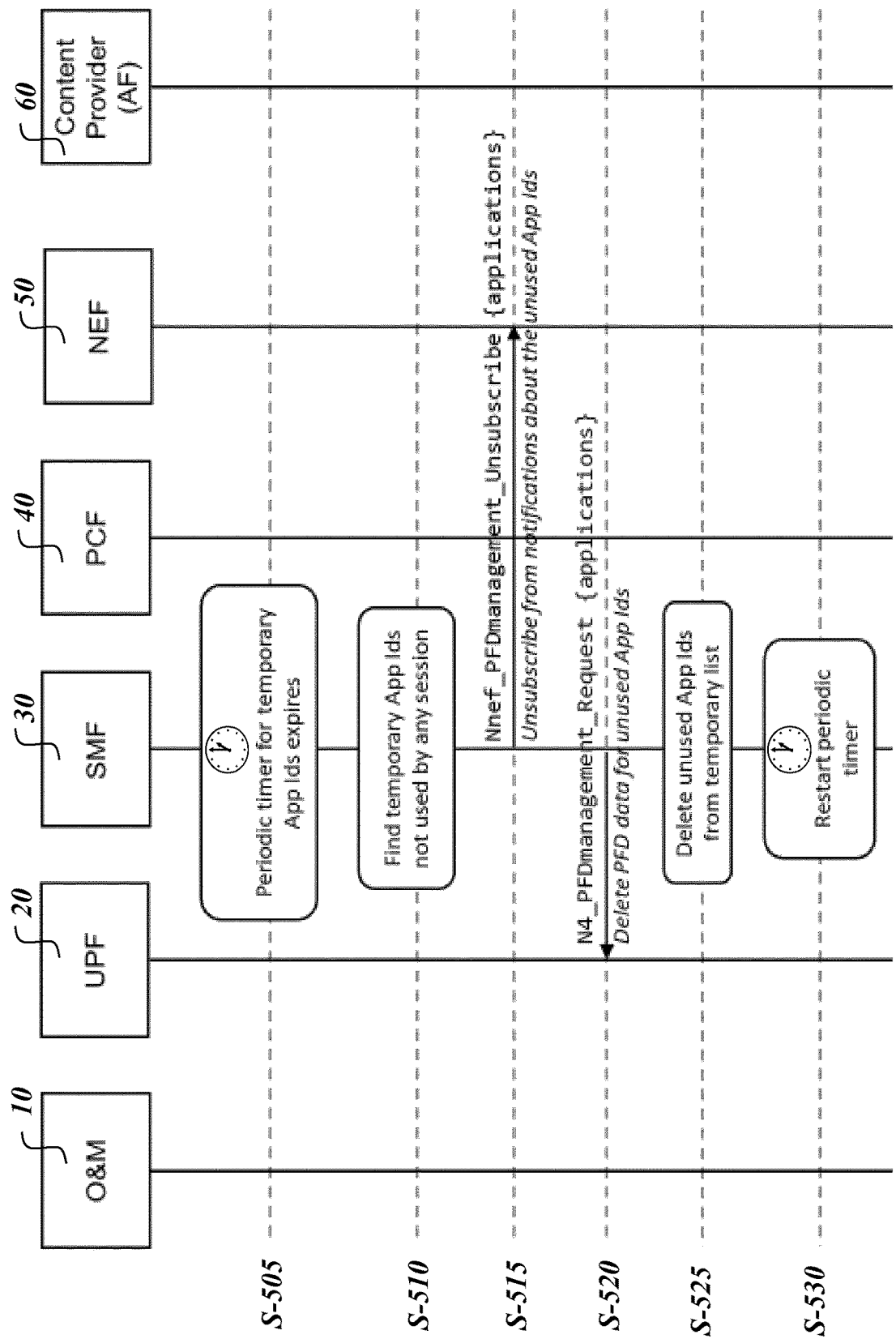
FIG. -5-

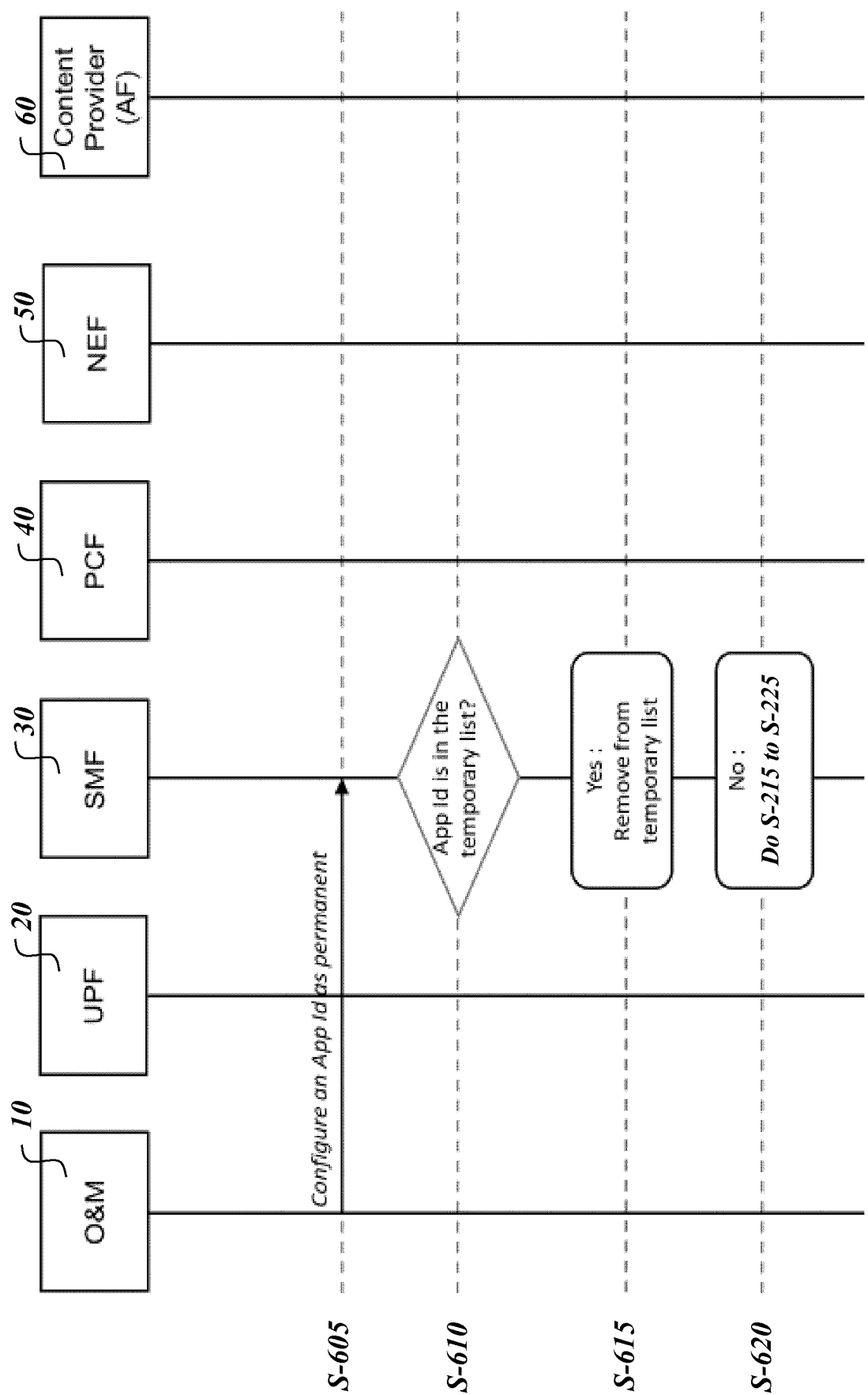
FIG. -6-

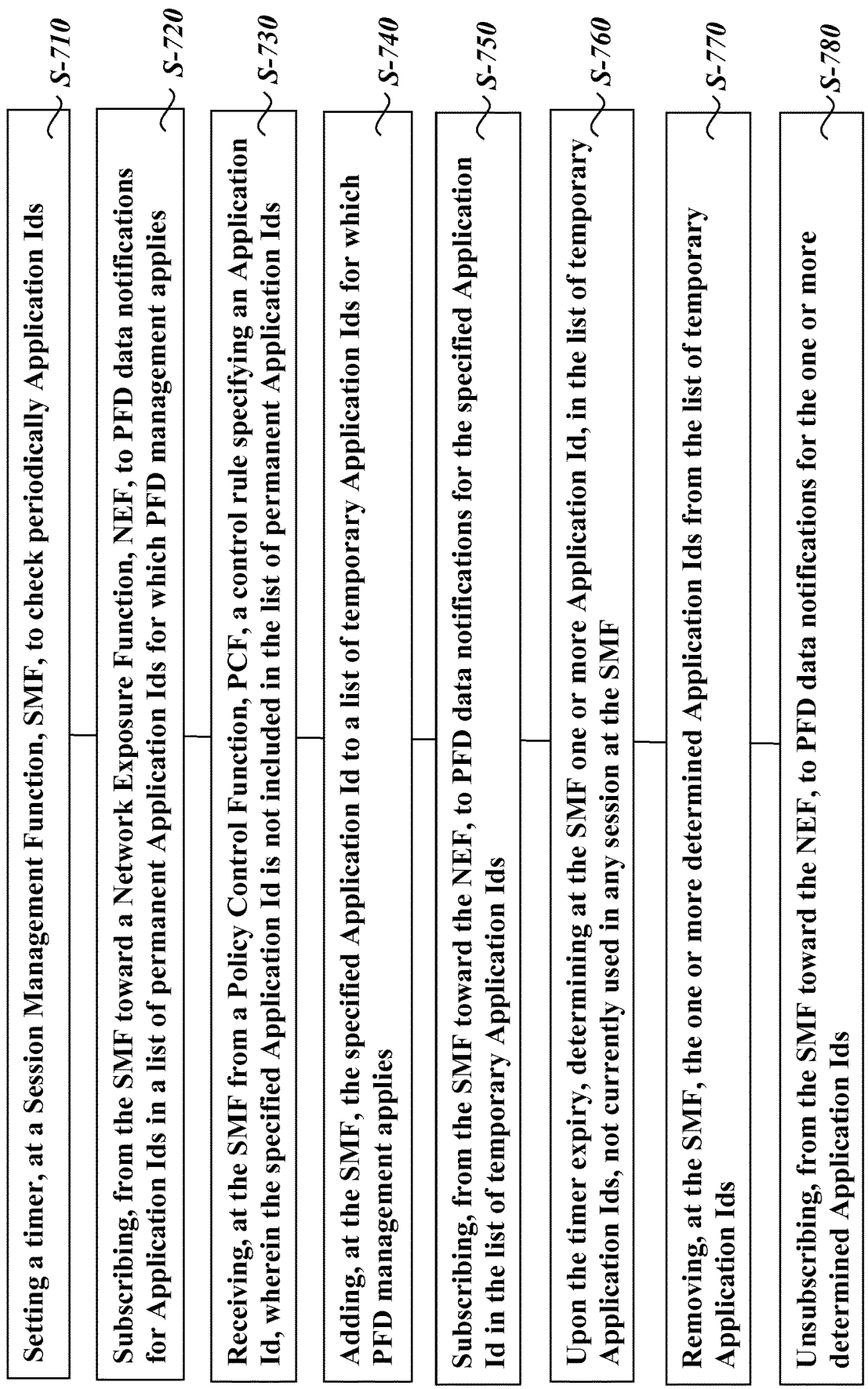

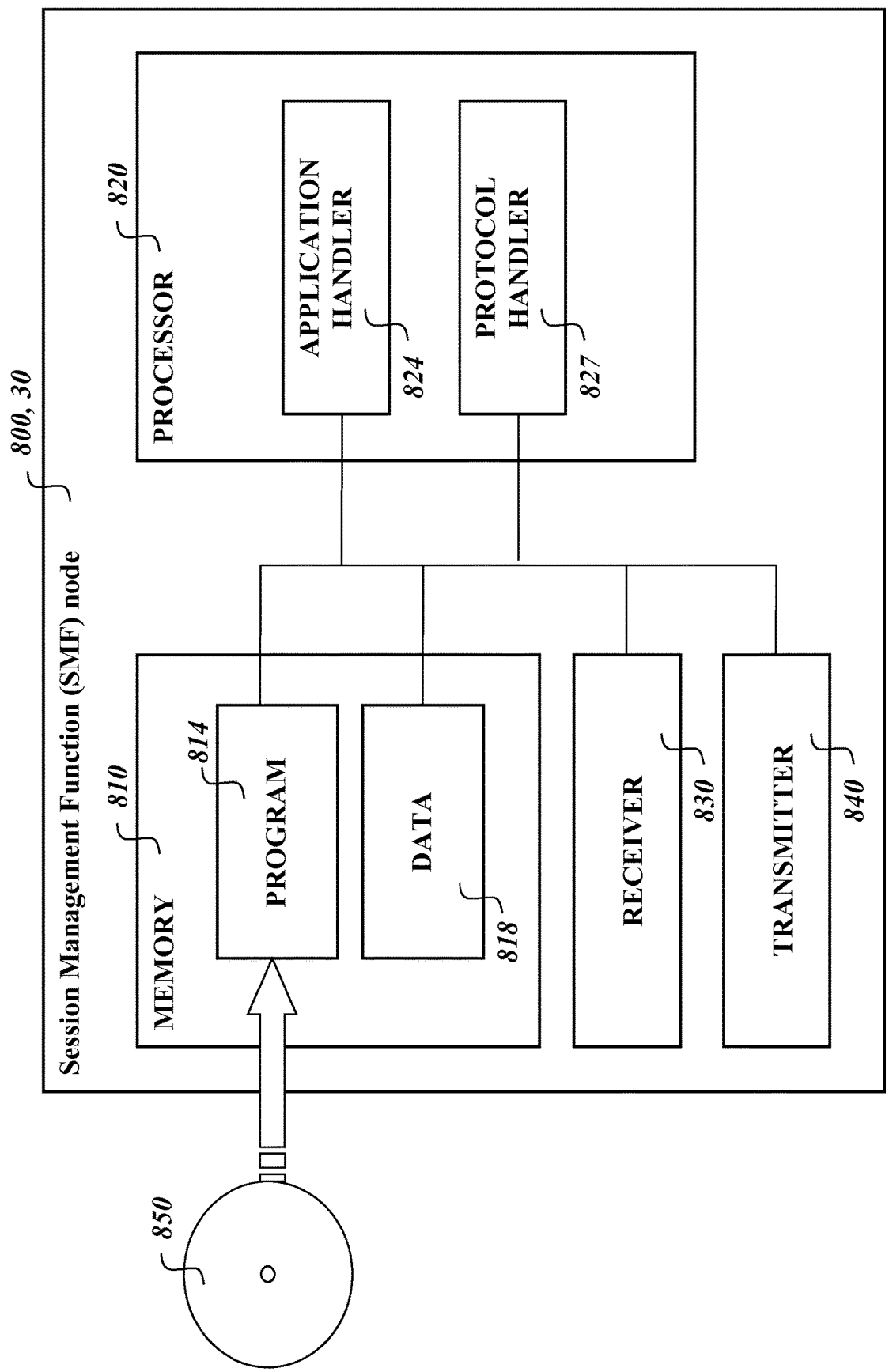
FIG. -8-

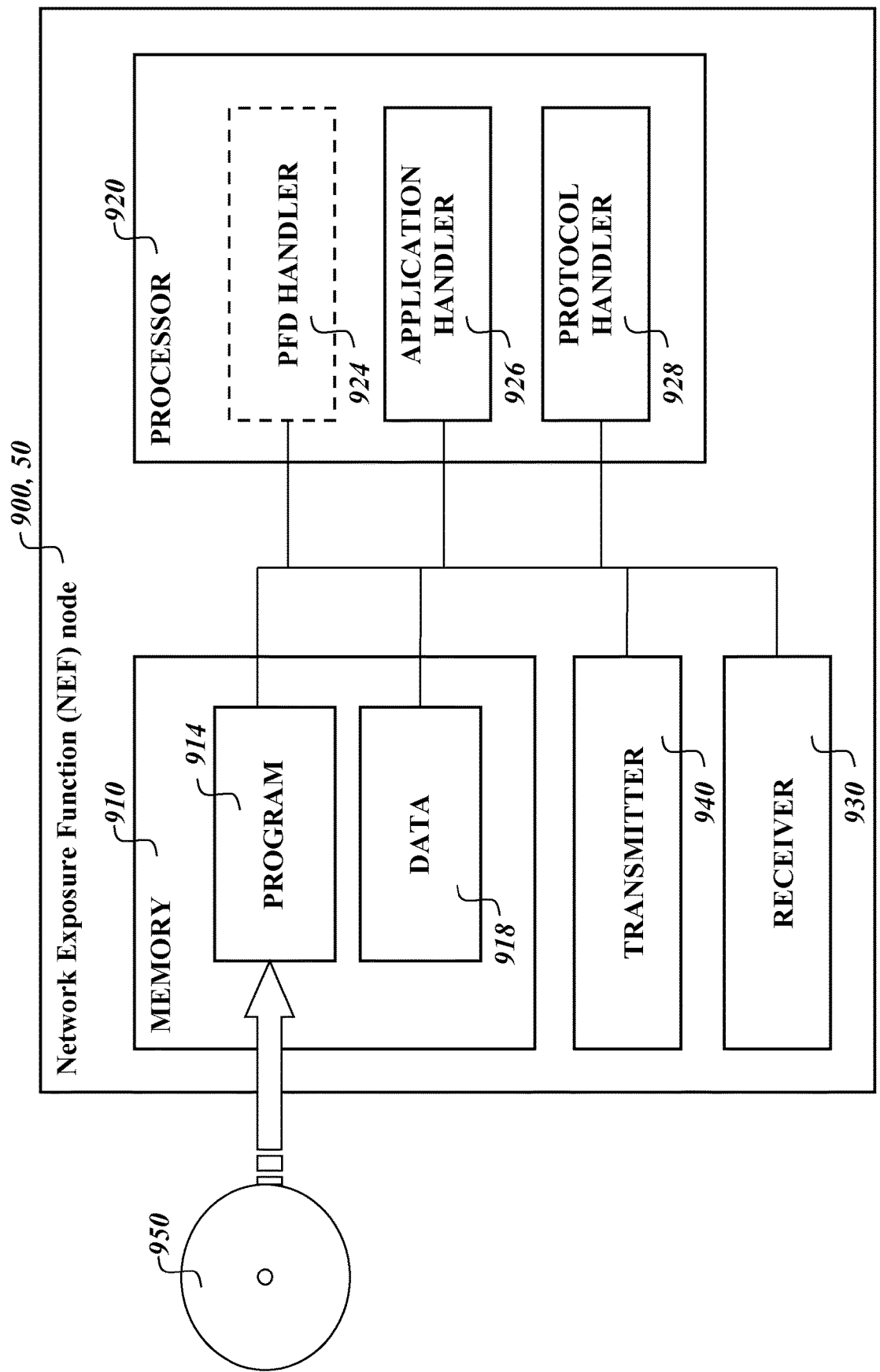
FIG.-9-

Receiving, at a Network Exposure Function, NEF, from a Session Management Function, SMF, a subscription to PFD data notifications for Application Ids for which PFD management applies

S-1010

Receiving, at the NEF from a content provider, a PFD management update for one or more Application Ids along with an allowed delay for each Application Id, wherein at least one Application Id amongst the one or more Application Ids has been subscribed by the SMF to PFD data notifications for the Application Id

S-1020

Determining, at the NEF for the at least one Application Id and based on its allowed delay, whether a notification has to be performed immediately or can be delayed within the allowed delay

S-1030

Where it is determined that the notification has to be performed immediately, transmitting, from the NEF toward the SMF, PFD data for the at least one Application Id;

S-1040

Where it is determined that the notification can be delayed, scheduling at the NEF a maintenance delay for notification within the allowed delay and, upon expiry of this maintenance delay, transmitting, from the NEF toward the SMF, PFD data for the at least one Application Id

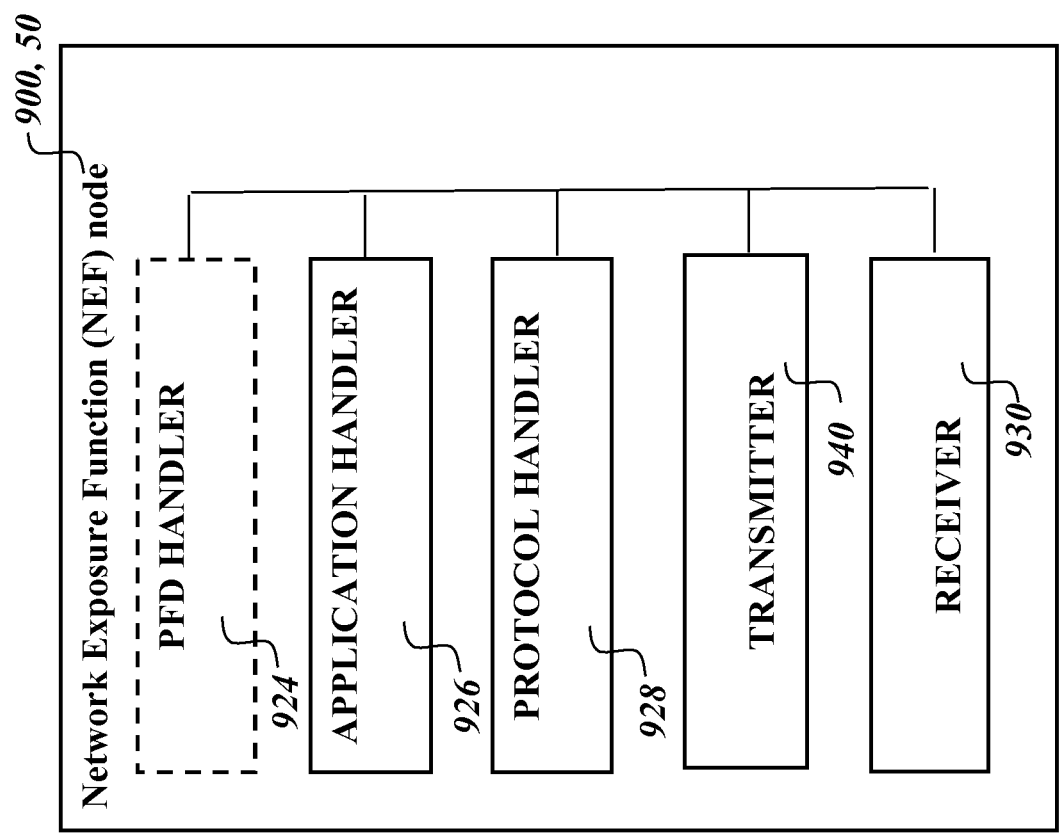
FIG.-12-
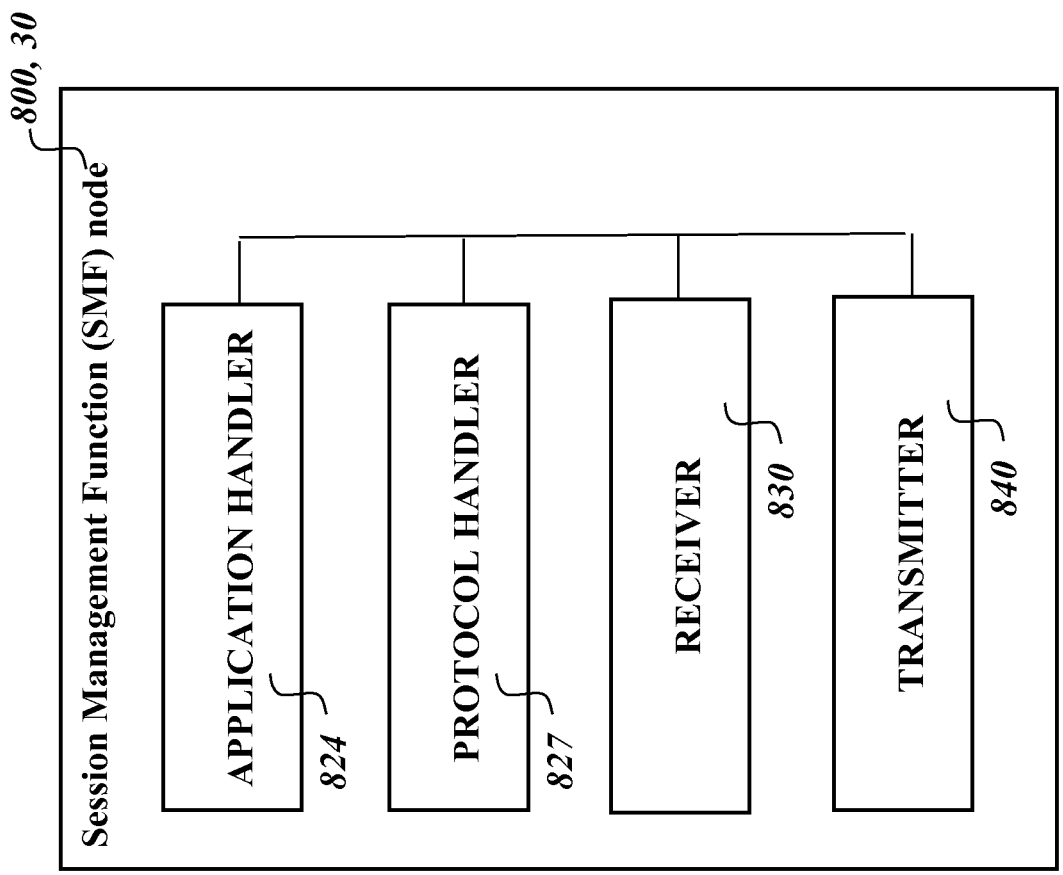
FIG.-11-

PROCEDURES FOR PACKET FLOW DESCRIPTION MANAGEMENT

TECHNICAL FIELD

The present invention generally relates to Packet Flow Description management; and, more specifically, the invention relates to Packet Flow Description management updates.

BACKGROUND

Control and user plane separation (CUPS) allows separated control plane and user plane functions and, in 5G, CUPS is referring to Session Management Function (SMF) and User Plane Function (UPF), as network functions (NF), and to the N4 reference point between them, which is based on Packet Forwarding Control Protocol (PFCP). The SMF controls the packet processing in the UPF by establishing, modifying or deleting PFCP session contexts and by provisioning packet detection rules per PFCP session context, whereby a PFCP session context may correspond to an individual Packet Data Network (PDN) connection or a standalone PFCP session not tied to any PDN connection. See 3GPP TS 23.502 V15.4.1 for more information.

A Packet Detection Rule (PDR) usually contains an Application Id associated to a set of matching rules that, when met by traffic received by a UPF, identify the associated application, e.g. a mobile application. The matching rules may be provisioned in the UPF through a Packet Flow Description (PFD) management in a 5G network. In this case, the matching rules are defined by an Application Function (AF) owned by a content provider, are provisioned from the AF to a Network Exposure Function (NEF), in the operator's network through a Nnef interface, and are stored in a User Data Repository (UDR).

The SMF can fetch PFD data for the applications from the NEF, using the operations offered through a Service Based Architecture (SBA), and can also subscribe to the NEF on notifications about PFD data for the applications, either for a specific list or for all of them. Both fetching and subscribing may also be combined.

On a pull mode, when a Policy and Charging Control (PCC) rule, which refers to an Application Id, is installed by a Policy Control Function (PCF) in the SMF, if the SMF has no knowledge of such Application Id, the SMF will fetch its PFD data from the NEF.

The SMF then starts a caching timer and, when the caching timer expires, the SMF checks if the Application Id is in use in any of the active sessions: if the Application Id is in use, the SMF fetches an update of the PFD data for the Application Id and forwards it to the UPF through the N4 interface; and, if the Application Id is not in use by any session, the SMF removes its data from the UPF through the N4 interface and stops the caching timer.

On a subscription mode, the SMF subscribes to the NEF for notifications on updated PFD data when such PFD data are newly provisioned or modified by the AF using the Nnef_PFDManagement Create and Update operations. The NEF may schedule provisioning of such PFD data to a convenient time, e.g. a maintenance window, as long as a so-called Allowed Delay for each Application Id is not exceeded. The SMF must have previously subscribed to the NEF for PFD Management notifications.

On a combination mode, which is not covered in 5G 3GPP specifications, the SMF has subscribed to the NEF but the NEF has delayed the provisioning notification to a later moment. When the PCC rule is installed and the SMF has no knowledge about the involved Application Id, the SMF fetches the PFD data for the Application Id and stores the PFD data in UPF through the N4 interface.

Then, the SMF starts the caching timer to update or delete the PFD data as in the pull mode. At present, however, 3GPP does not state how to combine the NEF subscription in 5G with the updates and deletion controlled by the caching timer in 4G.

Currently, pull mode and combination mode perform periodic requests for PFD updates on all Application Ids, and this generates a constant background load in the SMF, the NEF and the UPF, even if applications have not been updated. For example, the SMF queries the NEF for PFD data for Application Ids and forwards all responses to UPF, irrespective of whether the PFD data have changed or not, the NEF receives and handles the requests and the UPF updates PFD data for Application Ids even if they have not changed.

In addition, update timers are set on per Application Id basis, which spreads update requests but prevents several Application Ids from being retrieved in the same message, creating more load in the three involved nodes.

Constantly performing such a large number of PFD updates is not only very consuming in terms of processor load, but also increases signalling bandwidth in the N4 interface. This will result in a further need for scalability in CPF, UPF and NEF, leading to increased CAPEX.

Updates are performed in an uncontrolled way: multiple individual updates are performed at random points in time and it is difficult to evaluate the effect in traffic handling, making it very difficult to perform rollbacks when updates lead to network malfunction. Troubleshooting and network manageability is compromised.

SUMMARY

The present invention is aimed to overcome these drawbacks and provides for a mechanism whereby PFD data for a selected number of applications are stored and updated permanently, whilst PFD data for other applications are only temporarily stored so that storage and updates are released when these other applications are not in use.

In accordance with a first aspect of the present invention, there is provided a method of optimizing Packet Flow Description, PFD, management updates in a telecommunication network.

This method is carried out at a Session Management Function, SMF, and comprises setting a timer to check periodically Application Ids; subscribing, toward a Network Exposure Function, NEF, to PFD data notifications for Application Ids in a list of permanent Application Ids for which PFD management applies; receiving, from a Policy Control Function, PCF, a control rule specifying an Application Id, wherein the specified Application Id is not included in the list of permanent Application Ids; adding the specified Application Id to a list of temporary Application Ids for which PFD management applies; and subscribing, toward the NEF, to PFD data notifications for the specified Application Id in the list of temporary Application Ids.

Then, upon the timer expiry, the method also comprises determining one or more Application Id, in the list of temporary Application Ids, not currently used in any session at the SMF; removing the one or more determined Application Ids from the list of temporary Application Ids; and unsubscribing, toward the NEF, to PFD data notifications for the one or more determined Application Ids.

For the purpose of the present specification, a permanent Application Id is an Application Id which cannot be removed and/or released by the SMF on its own; whereas a temporary Application Id is an Application Id which can be removed and/or released by the SMF on its own, upon detecting that the temporary Application Id is not in use by any SMF session.

Advantageously in this method, the SMF may be configured, from an Operation and Maintenance, O&M, entity, with the list of permanent Application Ids for which PFD management applies. Where this is the case, each SMF of a plurality of SMFs is configured with a list of permanent Application Ids per SMF basis.

This method carried out at the SMF may further include different and advantageous embodiments, which may be appropriately combined.

In an embodiment, this method may further comprise removing, from the O&M entity, an Application Id from the list of permanent Application Ids; and unsubscribing, toward the NEF, to PFD data notifications for the Application Id removed from the list of permanent Application Ids. Further in this embodiment, the method may also comprise removing, toward a User Plane Function, UPF, the PFD data for the Application Id removed from the list of permanent Application Ids.

If the removed Application Id is later specified in a control rule, such Application Id would be added to the list of temporary Application Ids and thus handled.

In an embodiment, this method may further comprise configuring the SMF, from the O&M entity, with an Application Id from the list of temporary Application Ids as a permanent Application Id; adding the Application Id to the list of permanent Application Ids; and removing the Application Id from the list of temporary Application Ids. This embodiment allows the operator to convert a temporary Application Id, which became very frequently used, into a permanent Application Id.

In an embodiment, this method may further comprise retrieving, from the NEF, PFD data for each Application Id in the list of permanent Application Ids; and transmitting, toward a UPF, the PFD data for each Application Id in the list of permanent Application Ids.

In an embodiment, this method may further comprise retrieving, from the NEF, PFD data for the specified Application Id in the list of temporary Application Ids; and transmitting, toward a UPF, the PFD data for the specified Application Id in the list of temporary Application Ids. In this embodiment, upon the timer expiry, the method may further comprise requesting, toward the UPF, removal of PFD data for the one or more determined Application Ids.

In an embodiment, upon the timer expiry, the method may further comprise resetting the timer to continue checking periodically the Application Ids. Resetting the timer may be performed if required at all since the timer may be a sort of continuous timer with a periodic alarm that does not need to be changed.

In accordance with a second aspect of the present invention, there is provided a computer program comprising instructions which, when executed on at least one processor, cause the at least one processor to carry out the method carried out at the SMF as discussed above. A computer program product comprising this computer program is also provided.

In accordance with a third aspect of the present invention, there is provided a Session Management Function, SMF, node configured to optimize Packet Flow Description, PFD, management updates in a telecommunication network.

This SMF node further is configured to set a timer to check periodically Application Ids; subscribe, toward a Network Exposure Function, NEF, via a transmitter, to PFD data notifications for Application Ids in a list of permanent Application Ids for which PFD management applies; receive, from a Policy Control Function, PCF, via a receiver, a control rule specifying an Application Id, wherein the specified Application Id is not included in the list of permanent Application Ids; add the specified Application Id to a list of temporary Application Ids for which PFD management applies; and subscribe, toward the NEF via the transmitter, to PFD data notifications for the specified Application Id in the list of temporary Application Ids.

Then, upon the timer expiry, this SMF node may further be operable to determine one or more Application Id, in the list of temporary Application Ids, not currently used in any session at the SMF node; remove the one or more determined Application Ids from the list of temporary Application Ids; and unsubscribe, toward the NEF via the transmitter, to PFD data notifications for the one or more determined Application Ids.

In the following, advantageous embodiments appropriately combinable are disclosed for the SMF node in the following.

In an embodiment, the SMF node may be configured from an O&M entity with a list of permanent Application Ids for which PFD management applies. In this embodiment, each SMF node of a plurality of SMF nodes may be configured with a list of permanent Application Ids per SMF basis.

In an embodiment, the SMF node may further be configured to remove, from the O&M entity via the receiver, an Application Id from the list of permanent Application Ids; and unsubscribe, toward the NEF via the transmitter, to PFD data notifications for the Application Id removed from the list of permanent Application Ids.

In this embodiment, the SMF node may further be configured to remove, toward the UPF via the transmitter, the PFD data for the Application Id removed from the list of permanent Application Ids.

In an embodiment, the SMF node may further be configured, from the O&M entity via the receiver, with an Application Id from the list of temporary Application Ids as a permanent Application Id. In this embodiment, the SMF node may further be configured to add this Application Id to the list of permanent Application Ids and remove this Application Id from the list of temporary Application Ids.

In an embodiment, the SMF node may further be configured to retrieve, from the NEF via the receiver, PFD data for each Application Id in the list of permanent Application Ids; and transmit, toward a UPF via the transmitter, the PFD data for each Application Id in the list of permanent Application Ids.

In an embodiment, the SMF node may further be configured to retrieve, from the NEF via the receiver, PFD data for the specified Application Id in the list of temporary Application Ids; and transmit, toward a UPF via the transmitter, the PFD data for the specified Application Id in the list of temporary Application Ids. In this embodiment, upon the timer expiry, the SMF node may further be configured to request, toward the UPF via the transmitter, removal of PFD data for the one or more determined Application Ids.

In an embodiment, also upon the timer expiry, the SMF node may further be configured to reset the timer to continue checking periodically the Application Ids.

In accordance with a fourth aspect of the present invention, there is provided a method of optimizing Packet Flow Description, PFD, management updates in a telecommunication network.

This method is carried out at a Network Exposure Function, NEF, and comprises receiving, from a Session Management Function, SMF, a subscription to PFD data notifications for Application Ids for which PFD management applies; receiving, from a Content Provider, a PFD management update for one or more Application Ids along with an allowed delay for each Application Id, wherein at least one Application Id amongst the one or more Application Ids has been subscribed by the SMF to PFD data notifications for the Application Id; determining, for the at least one Application Id and based on its allowed delay, whether a notification has to be performed immediately or can be delayed within the allowed delay; where it is determined that the notification has to be performed immediately, transmitting toward the SMF the PFD data for the at least one Application Id; and, where it is determined that the notification can be delayed, scheduling a maintenance delay for notification within the allowed delay and, upon expiry of this maintenance delay, transmitting toward the SMF the PFD data for the at least one Application Id.

In accordance with a fifth aspect of the present invention, there is provided a computer program comprising instructions which, when executed on at least one processor, cause the at least one processor to carry out the method carried out at the NEF as discussed above. A computer program product comprising this computer program is also provided.

In accordance with a sixth aspect of the present invention, there is provided a Network Exposure Function, NEF, node configured to optimize Packet Flow Description, PFD, management updates in a telecommunication network.

This NEF node further is configured to receive, from an SMF via a receiver, a subscription to PFD data notifications for Application Ids for which PFD management applies; receive, from a content provider via the receiver, a PFD management update for one or more Application Ids along with an allowed delay for each Application Id, wherein at least one Application Id amongst the one or more Application Ids has been subscribed by the SMF to PFD data notifications for the Application Id; determine, for the at least one Application Id and based on its allowed delay, whether a notification has to be performed immediately or can be delayed within the allowed delay; where it is determined that the notification has to be performed immediately, transmit, toward the SMF via a transmitter, PFD data for the at least one Application Id; and where it is determined that the notification can be delayed, schedule a maintenance delay for notification within the allowed delay and, upon expiry of this maintenance delay, transmit, toward the SMF via a transmitter, PFD data for the at least one Application Id.

BRIEF DESCRIPTION OF THE DRAWINGS

The features, objects and advantages of the invention will become apparent by reading this description in conjunction with the accompanying drawings, in which:

FIG. 1 depicts a reference architecture which includes NF nodes relevant for the present specification.

FIG. 2 illustrates an exemplary sequence of actions carried out for provision of PFD data for permanent Application Ids, in accordance with an embodiment.

FIG. 3 illustrates an exemplary sequence of actions carried out for provision of PFD data for temporary Application Ids, in accordance with an embodiment.

FIG. 4 illustrates an exemplary sequence of actions carried out for updating of PFD data for permanent and/or temporary Application Ids, in accordance with an embodiment.

FIG. 5 illustrates an exemplary sequence of actions carried out for removal of PFD data for unused temporary Application Ids, in accordance with an embodiment.

FIG. 6 illustrates an exemplary sequence of actions carried out for conversion of a temporary Application Id into a permanent Application Id, in accordance with an embodiment.

FIG. 7 shows an exemplary method of optimizing PFD management updates, the method carried out at an SMF.

FIG. 8 shows a basic component structure of an SMF node, in accordance with an embodiment.

FIG. 9 shows a basic component structure of a NEF node in accordance with an embodiment.

FIG. 10 shows an exemplary method of optimizing PFD management updates, the method carried out at a NEF.

FIG. 11 shows a basic component structure of an SMF node in accordance with another embodiment.

FIG. 12 shows a basic component structure of a NEF node in accordance with another embodiment.

DETAILED DESCRIPTION

The following describes currently preferred embodiments of apparatuses and methods of optimizing PFD management updates in a telecommunication network.

For illustrative purposes, FIG. 1 depicts a reference architecture which includes NF nodes relevant for the present specification, such as NEF, AF, PCF, SMF and UPF.

In embodiments further discussed, each SMF may be configured with a list of permanent Application Ids for which PFD management applies. The list of permanent Application Ids may be configured independently per SMF basis, based on network operator criteria, e.g. the SMF geographical area.

In an embodiment, each SMF subscribes to the NEF for PFDs of all Application Ids in its PFD management list. The NEF notifies of Application Ids subscribed by each SMF, as per standard defined procedure. PFD data for permanent Application Ids can be removed from an SMF at any time, e.g. through an O&M interface. Upon Application removal, the SMF may unsubscribe it from the NEF, as per standard defined procedure.

Temporary Application Ids can be installed through PCC Rules as disclosed in the following. When a PCC rule referring to an Application Id is installed in the SMF, if the SMF has no knowledge of such Application Id, it will subscribe to the NEF about this Application Id and store it in a list of temporary Application Ids. A timer may be used to check the temporary application Ids periodically. When this timer expires, SMF finds Application Ids in the list that are not being used by any PFCP session (i.e. not included in any installed PDR) and: deletes them from the UPF using PFCP signalling, unsubscribes them from the NEF, and removes them from the list of temporary Application Ids.

If a temporary Application Id is subsequently configured as a permanent Application in SMF, the SMF may remove the Application Id from the list of temporary application Ids, so that the subscription to the NEF becomes permanent. Likewise, an operator could also convert a permanent Application Id into a temporary one by removing it from the list of permanent ones, unsubscribing it from the NEF and deleting it from the UPF. When such Application Id is later used by a session, it will be handled as a temporary one.

An embodiment of the invention for provision of PFD data for permanent Application Ids is discussed in the following with reference to FIG. 2.

As FIG. 2 illustrates, a Content Provider 60 provisions, during step S-205, PDF data for its managed applications to the NEF Management service within the NEF 50; the SMF 30 is configured during step S-210, likely from an O&M entity 10, with a list of permanent Application Ids, wherein this list may be customized per each SMF depending on operator criteria, for instance due to geographical distribution; the SMF 30 fetches, during step S-215, PFD data from the NEF 50 for the Application Ids in the list of permanent Application Ids; the SMF then forwards, during step S-220, the PFD management data to a UPF 20, which stores them accordingly; and, finally during step S-225, the SMF 30 subscribes to NEF 50 on notifications of changes related to these Application Ids.

An embodiment of the invention for provision of PFD data for temporary Application Ids is discussed in the following with reference to FIG. 3.

As FIG. 3 illustrates, the SMF 30 receives from a PCF 40, during step S-305, a PCC rule for which an Application Id is specified; the SMF finds, during step S-310, that the received Application Id is not included in the list of permanent Application Ids; the SMF 30 fetches, during step S-315, PFD data for the unknown Application Id from the NEF 50; the SMF 30 forwards, during step S-320, the PFD management data to the UPF 20, which stores them accordingly; the SMF 30 subscribes to NEF 50, during step S-325, on notifications of changes related to this Application Id; and the SMF then adds, during step S-330, the Application Id to the list of temporary Application Ids.

An embodiment of the invention for updating of PFD data for permanent and/or temporary Application Ids is discussed in the following with reference to FIG. 4.

As FIG. 4 illustrates, the NEF 50 receives, during step S-405, a PFD Management update for one or more temporary and/or permanent Application Ids from the Content Provider 60; then, the NEF 50 may either immediately transmit, during step S-410, the PFD Management data on updated Application Ids to SMF 30 that has subscribed to them, or schedule and further transmit, during steps S-420 and S-425, the PFD updates of the Application Ids for a time before an 'Allowed Delay' per Application Id, for instance to a next maintenance window. In both alternative transmissions, the SMF 30 further transmits toward the UPF 20, during steps S-415 or S-430, the PFD Management data on updated Application Ids, and the UPF 20 stores them accordingly.

Regarding the embodiment illustrated in FIG. 4, as part of the PFD Management information, the Content Provider 60 may specify an 'Allowed Delay' time value for each Application Id for which traffic detection data is provided. The choice on whether the update is performed immediately or not is dependent on an operator policy, but the Allowed Delay time must not be exceeded. Whenever the Allowed Delay is long enough, it is beneficial for the operator to perform such updates during a maintenance window. If the update is due earlier than the next maintenance window, it may be performed immediately, although other scheduling criteria may be applied by the operator, e.g. concentration of several updates, distribution of heavy updates, update inhibition during high traffic load, etc.

An embodiment of the invention for removal of PFD data for unused temporary Application Ids is discussed in the following with reference to FIG. 5.

As FIG. 5 illustrates, the SMF 30 is aware during step S-505 of a timer expiry for checking unused the temporary Application Ids; the SMF 30 finds, during step S-510, temporary Application Ids that have not been used by any PFCP session, i.e. not included in any installed PDR; the SMF 30 unsubscribes to the NEF 50, during step S-515, to notifications of those Application Ids; the SMF 30 requests the UPF 20, during step S-520, to delete their associated PFD data; the SMF 30 removes, during step S-525, those Application Ids from the list of temporary Application Ids; and the SMF 30 may, during step S-530, reset the timer for unused temporary application Ids, if required at all since the timer may be a sort of continuous timer with a periodic alarm that does not need to be changed.

An embodiment of the invention for conversion of a temporary Application Id into a permanent Application Id is discussed in the following with reference to FIG. 6.

As FIG. 6 illustrates, the SMF 30 is configured from an O&M entity 10, during step S-605, with an Application Id to be managed as a permanent Application Id and thus included in the list of permanent Application Ids; the SMF 30 checks, during step S-610, if the configured Application Id is currently handled as a temporary Application Id, by checking if it is in the list of temporary Application Ids; if the answer is 'yes', the SMF 30 removes, during step S-615, the configured Application Id from the list of temporary Application Ids and, since it had already subscribed to the NEF about it, there is no need to subscribe it again; if the answer is 'no', the configured Application Id is handled at the SMF 30, during step S-620, as the provisioning of a new permanent Application Id discussed above with reference to FIG. 2, as detailed in steps S-215 to S-225.

FIG. 7 illustrates a method of optimizing PFD management updates, in accordance with an embodiment of the invention, the method carried out at an SMF.

As FIG. 7 illustrates, the SMF sets a timer, during step S-710, to check periodically Application Ids; the SMF subscribes, toward a NEF during step S-720, to PFD data notifications for Application Ids in a list of permanent Application Ids for which PFD management applies; the SMF receives, from a PCF during step S-730, a control rule specifying an Application Id, wherein the specified Application Id is not included in the list of permanent Application Ids; the SMF adds, during step S-740, the specified Application Id to a list of temporary Application Ids for which PFD management applies; the SMF subscribes, toward the NEF during step S-750, to PFD data notifications for the specified Application Id in the list of temporary Application Ids; upon the timer expiry, the SMF determines, during step S-760, one or more Application Id, in the list of temporary Application Ids, not currently used in any session at the SMF; the SMF removes, during step S-770, the one or more determined Application Ids from the list of temporary Application Ids; and the SMF unsubscribes, toward the NEF during step S-780, to PFD data notifications for the one or more determined Application Ids.

This method carried out at the SMF and discussed above with reference to FIG. 7 may further include different and advantageous embodiments, which may be appropriately combined.

In an embodiment, this method may comprise a step S-210 of configuring the SMF 30 from an O&M entity 10 with the list of permanent Application Ids for which PFD management applies. In this embodiment, each SMF of a plurality of SMFs may further be configured with a list of permanent Application Ids per SMF basis.

In an embodiment, this method may further comprise removing, from the O&M entity 10, an Application Id from the list of permanent Application Ids; and unsubscribing, toward the NEF 50, to PFD data notifications for the Application Id removed from the list of permanent Application Ids. Further in this embodiment, the method may also comprise removing, toward a UPF 20, the PFD data for the Application Id removed from the list of permanent Application Ids.

In an embodiment, this method may further comprise configuring the SMF 30 from the O&M entity 10, as done during e.g. step S-605, with an Application Id from the list of temporary Application Ids as a permanent Application Id; adding the Application Id to the list of permanent Application Ids; and removing the Application Id from the list of temporary Application Ids.

In an embodiment, this method may further comprise retrieving, from the NEF 50 as done during e.g. step S-215, PFD data for each Application Id in the list of permanent Application Ids; and transmitting toward a UPF 20, as done during e.g. step S-220, the PFD data for each Application Id in the list of permanent Application Ids.

In an embodiment, this method may further comprise retrieving, from the NEF 50 as done during e.g. step S-315, PFD data for the specified Application Id in the list of temporary Application Ids; and transmitting toward a UPF 20, as done during e.g. step S-320, the PFD data for the specified Application Id in the list of temporary Application Ids. In this embodiment, upon the timer expiry, the method may further comprise requesting, toward the UPF 20, removal of PFD data for the one or more determined Application Ids.

In an embodiment, upon the timer expiry, the method may further comprise resetting the timer, as done during e.g. step S-530, to continue checking periodically the Application Ids. Resetting the timer may be performed if required at all since the timer may be a sort of continuous timer with a periodic alarm that does not need to be changed.

FIG. 10 illustrates a method of optimizing PFD management updates, in accordance with an embodiment of the invention, the method carried out at a NEF.

As FIG. 10 illustrates, the NEF receives, from an SMF during step S-1010, a subscription to PFD data notifications for Application Ids for which PFD management applies; the NEF receives, from a Content Provider during step S-1020, a PFD management update for one or more Application Ids along with an allowed delay for each Application Id, wherein at least one Application Id amongst the one or more Application Ids has been subscribed by the SMF to PFD data notifications for the Application Id; the NEF determines, during step S-1030 for the at least one Application Id and based on its allowed delay, whether a notification has to be performed immediately or can be delayed within the allowed delay; where it is determined that the notification has to be performed immediately, during step S-1040, transmitting toward the SMF the PFD data for the at least one Application Id; and where it is determined that the notification can be delayed, during step S-1050, scheduling a maintenance delay for notification within the allowed delay and, upon expiry of this maintenance delay, transmitting toward the SMF the PFD data for the at least one Application Id.

Thanks to these methods discussed with reference to FIG. 7 and FIG. 10, and corresponding network nodes discussed afterwards, the processor load, storage and signalling bandwidth requirements to perform PFD management are greatly reduced. Therefore, scalability needs for the NEF, SMF and UPF nodes are minimized, resulting in reduced CAPEX.

PFD data for applications only used for temporary time periods can be added and removed automatically, e.g. in roaming situations or for applications used less frequently. Likewise, updates of PFD data for such temporary applications can be delayed to the next maintenance window and/or spread for a period of time and combined with updates of permanent applications in batches, allowing for signalling and processing optimization.

This allows to perform updates in a controlled way, as one consolidated change at a specific moment instead of many scattered changes at random points in time. The effect of such controlled change can be tested, and it can be rolled back in case adverse effects in traffic handling are noticed as a result of the change. It also allows such updates to take place when there is low traffic load, so spare capacity is available in the involved nodes, and the effect of any possible traffic disturbance is minimized during this low activity period.

The proposed solution allows interoperability between different network vendors as the improved behaviour does not require any modifications in the messages or information elements in the involved 3GPP protocols.

In order to carry out the method discussed above with reference to FIG. 7, different embodiments of an SMF node are illustrated in FIG. 8 and FIG. 11. For the sake of simplicity, in the following, just an SMF node 800 is cited, and whatever is discussed for the SMF node 800 is also valid for a node implementing the SMF 30.

In accordance with an embodiment illustrated in FIG. 8, the SMF node 800 may comprise at least one processor 820, and at least one memory 810 that stores processor-executable instructions 814. In this SMF node, the at least one processor interfaces with the at least one memory to execute the processor-executable instructions, whereby the SMF node is operable to perform the actions disclosed in the following.

This SMF node 800, illustrated in FIG. 8, may thus be operable to set a timer to check periodically Application Ids; subscribe, toward a NEF 50 via transmitter 840, to PFD data notifications for Application Ids in a list of permanent Application Ids for which PFD management applies; receive, from a PCF 40 via receiver 830, a control rule specifying an Application Id, wherein the specified Application Id is not included in the list of permanent Application Ids; add the specified Application Id to a list of temporary Application Ids for which PFD management applies; and subscribe, toward the NEF 50 via the transmitter 840, to PFD data notifications for the specified Application Id in the list of temporary Application Ids.

Then, upon the timer expiry, this SMF node 800 may further be operable to determine one or more Application Id, in the list of temporary Application Ids, not currently used in any session at the SMF node; remove the one or more determined Application Ids from the list of temporary Application Ids; and unsubscribe, toward the NEF 50 via the transmitter 840, to PFD data notifications for the one or more determined Application Ids.

In sub-embodiments for this embodiment illustrated in FIG. 8, an application handler 824 running in the processor 820 may handle the PFD data and logic related to the permanent Application Ids and temporary Application Ids, such as e.g. subscribing and unsubscribing toward the NEF, whereas a protocol handler 827 running in a processor 820 may control the transmitter 840 and receiver 830 for transmission and reception of messages.

If required at all, the SMF node 800, illustrated in FIG. 8, may be complemented with a data section 818 in memory to store PFD data and e.g. the list of permanent Application Ids and e.g. the list of temporary Application Ids.

The SMF node 800 illustrated in FIG. 8 may thus comprise the at least one processor 820 and the at least one memory 810, both in communication with each other, with the application handler 824, the protocol handler 827, the receiver 830 and the transmitter 840, and with other elements or units of the SMF node. The at least one memory 810 may comprise volatile and/or non-volatile memory. In particular, the at least one memory 810 may have a computer program 814 and data 618 stored therein. The computer program 814 may be loaded in the at least one memory 810 from a computer program product 850, such as any non-transitory computer readable medium, in which the computer program is stored. The data 818 may comprise the list of permanent Application Ids and the list of temporary Application Ids. The at least one processor 820 may be configured to carry out the functions of the application handler 824 and the protocol handler 827.

In accordance with another embodiment illustrated in FIG. 11, the SMF node 800 may be operable to set a timer to check periodically Application Ids; subscribe, toward a NEF 50 via transmitter 840, to PFD data notifications for Application Ids in a list of permanent Application Ids for which PFD management applies; receive, from a PCF 40 via receiver 830, a control rule specifying an Application Id, wherein the specified Application Id is not included in the list of permanent Application Ids; add the specified Application Id to a list of temporary Application Ids for which PFD management applies; and subscribe, toward the NEF 50 via the transmitter 840, to PFD data notifications for the specified Application Id in the list of temporary Application Ids.

Then, upon the timer expiry, this SMF node 800 may further be operable to determine one or more Application Id, in the list of temporary Application Ids, not currently used in any session at the SMF node; remove the one or more determined Application Ids from the list of temporary Application Ids; and unsubscribe, toward the NEF 50 via the transmitter 840, to PFD data notifications for the one or more determined Application Ids.

In sub-embodiments for this embodiment illustrated in FIG. 11, the SMF node 800 may comprise an application handler 824 operable to handle the PFD data and logic related to the permanent Application Ids and temporary Application Ids, such as e.g. subscribing and unsubscribing toward the NEF, and a protocol handler 827 operable to control the transmitter 840 and receiver 830 for transmission and reception of messages.

In the following, advantageous embodiments combinable in any order are disclosed for both embodiments discussed above with reference to FIG. 8 and FIG. 11.

In an embodiment, the SMF node 800 may be configured from an O&M entity 10 with a list of permanent Application Ids for which PFD management applies. In this embodiment, each SMF node of a plurality of SMF nodes may be configured with a list of permanent Application Ids per SMF basis.

In an embodiment, the SMF node 800 may further be configured to remove, from the O&M entity 10 via the receiver 830, an Application Id from the list of permanent Application Ids; and unsubscribe, toward the NEF 50 via the transmitter 840, to PFD data notifications for the Application Id removed from the list of permanent Application Ids. In this embodiment, the SMF node 800 may further be configured to remove, toward the UPF 20 via the transmitter 840, the PFD data for the Application Id removed from the list of permanent Application Ids.

In an embodiment, the SMF node 800 may further be configured, from the O&M entity 10 via the receiver 830, with an Application Id from the list of temporary Application Ids as a permanent Application Id. In this embodiment, the SMF node 800 may further be configured to add this Application Id to the list of permanent Application Ids and remove this Application Id from the list of temporary Application Ids.

In an embodiment, the SMF node 800 may further be configured to retrieve, from the NEF 50 via the receiver 830, PFD data for each Application Id in the list of permanent Application Ids; and transmit, toward a UPF 20 via the transmitter 840, the PFD data for each Application Id in the list of permanent Application Ids.

In an embodiment, the SMF node 800 may further be configured to retrieve, from the NEF 50 via the receiver 830, PFD data for the specified Application Id in the list of temporary Application Ids; and transmit, toward a UPF 20 via the transmitter 840, the PFD data for the specified Application Id in the list of temporary Application Ids. In this embodiment, upon the timer expiry, the SMF node 800 may further be configured to request, toward the UPF 20 via the transmitter 840, removal of PFD data for the one or more determined Application Ids.

In an embodiment, also upon the timer expiry, the SMF node 800 may further be configured to reset the timer to continue checking periodically the Application Ids.

In order to carry out the method discussed above with reference to FIG. 10, different embodiments of a NEF node are illustrated in FIG. 9 and FIG. 12. For the sake of simplicity, in the following, just a NEF node 900 is cited, and whatever is discussed for the NEF node 900 is also valid for a node implementing the NEF 50.

In accordance with an embodiment illustrated in FIG. 9, the NEF node 900 may comprise at least one processor 920, and at least one memory 910 that stores processor-executable instructions 914. In this NEF node 900, the at least one processor interfaces with the at least one memory to execute the processor-executable instructions, whereby the NEF node 900 is operable to perform the actions disclosed in the following.

This NEF node 900, illustrated in FIG. 9, may thus be operable to receive, from an SMF 30 via receiver 930, a subscription to PFD data notifications for Application Ids for which PFD management applies; receive, from a content provider 60 via the receiver 930, a PFD management update for one or more Application Ids along with an allowed delay for each Application Id, wherein at least one Application Id amongst the one or more Application Ids has been subscribed by the SMF 30 to PFD data notifications for the Application Id; determine, for the at least one Application Id and based on its allowed delay, whether a notification has to be performed immediately or can be delayed within the allowed delay; where it is determined that the notification has to be performed immediately, transmit, toward the SMF 30 via transmitter 940, PFD data for the at least one Application Id; and where it is determined that the notification can be delayed, schedule a maintenance delay for notification within the allowed delay and, upon expiry of this maintenance delay, transmit, toward the SMF 30 via transmitter 940, PFD data for the at least one Application Id.

In sub-embodiments for this embodiment illustrated in FIG. 9, an application handler 926 running in a processor 920 may handle the PFD data and logic related to the Application Ids, such as e.g. subscribing and unsubscribing from the SMF, whereas a protocol handler 928 running in a processor 920 may control the transmitter 940 and receiver 930 for transmission and reception of messages. Optionally in this sub-embodiment, a PFD handler 924 running in a processor 920 may handle the PFD management updates and allowed delay per Application Id; what may be handled, otherwise, by the application handler 926.

If required at all, the NEF node 900, illustrated in FIG. 9, may be complemented with a data section 918 in memory 910 to store PFD data and e.g. Application Ids with respective allowed delays.

The NEF node 900 illustrated in FIG. 9 may thus comprise the at least one processor 920 and the at least one memory 910, both in communication with each other, with the application handler 926, the protocol handler 928, optionally the PFD handler 924, the receiver 930 and the transmitter 940, and with other elements or units of the NEF node. The at least one memory 910 may comprise volatile and/or non-volatile memory. In particular, the at least one memory 910 may have a computer program 914 and data 918 stored therein. The computer program 914 may be loaded in the at least one memory 910 from a computer program product 950, such as any non-transitory computer readable medium, in which the computer program is stored. The data 918 may comprise the PFD data and e.g. Application Ids with respective allowed delays. The at least one processor 920 may be configured to carry out the functions of the application handler 926 and the protocol handler 928, as well as the PFD handler 924, if any.

In accordance with another embodiment illustrated in FIG. 12, the NEF node 900 may be operable to receive, from an SMF 30 via receiver 930, a subscription to PFD data notifications for Application Ids for which PFD management applies; receive, from a content provider 60 via the receiver 930, a PFD management update for one or more Application Ids along with an allowed delay for each Application Id, wherein at least one Application Id amongst the one or more Application Ids has been subscribed by the SMF 30 to PFD data notifications for the Application Id; determine, for the at least one Application Id and based on its allowed delay, whether a notification has to be performed immediately or can be delayed within the allowed delay; where it is determined that the notification has to be performed immediately, transmit, toward the SMF 30 via transmitter 940, PFD data for the at least one Application Id; and where it is determined that the notification can be delayed, schedule a maintenance delay for notification within the allowed delay and, upon expiry of this maintenance delay, transmit, toward the SMF 30 via transmitter 940, PFD data for the at least one Application Id.

In sub-embodiments for this embodiment illustrated in FIG. 12, the NEF node 900 may comprise an application handler 926 operable to handle the PFD data and logic related to the Application Ids, such as e.g. subscribing and unsubscribing from the SMF, and a protocol handler 928 operable to control the transmitter 940 and receiver 930 for transmission and reception of messages. Optionally in this sub-embodiment, the NEF node 900 may comprise a PFD handler 924 operable to handle the PFD management updates and allowed delay per Application Id.

The invention may also be practised by one or more computer programs comprising instructions which, when executed on at least one processor, cause the at least one processor to carry out any one of the methods discussed above.

This solution improves the update mechanism of the PFD Management procedures by using a subscription model, instead of periodic updates. It allows managing PFD data for permanent and temporary Application Ids in a similar way, improving the update and deletion mechanisms for temporary applications and allowing them to be updated in a controlled way at conveniently scheduled times. It also enables changing the provisioning model from the pull mode to the subscription mode, by converting temporary applications into permanent ones, and vice versa.

The aim of the solution is to optimize signalling between CPF and UPF for PFD Management updates at the same time as storage requirements in UPF are reduced through the pull mode and allow operators to keep control of updates whenever possible. Consequently, performance and scalability requirements are greatly reduced, resulting in CAPEX reductions for the NEF, SMF and UPF nodes.

Moreover, the proposed solution allows interoperability between different network vendors as the improved behaviour does not require any modifications in the messages or information elements in the involved 3GPP protocols.

The invention is described above in connection with various embodiments that are intended to be illustrative and non-restrictive. It is expected that those of ordinary skill in this art may modify these embodiments. The scope of the invention is defined by the claims in conjunction with the description and drawings, and all modifications that fall within the scope of the claims are intended to be included therein.

The invention claimed is:

1. A method of optimizing Packet Flow Description (PFD) management updates in a telecommunication network, the method carried out at a Session Management Function (SMF) and comprising:
   setting a timer to check periodically Application IDs;
   subscribing, toward a Network Exposure Function (NEF), to PFD data notifications for Application IDs in a list of permanent Application IDs for which PFD management applies;
   receiving, from a Policy Control Function (PCF), a control rule specifying an Application ID, wherein the specified Application ID is not included in the list of permanent Application IDs;
   adding the specified Application ID to a list of temporary Application IDs for which PFD management applies;
   subscribing, toward the NEF, to PFD data notifications for the specified Application ID in the list of temporary Application IDs;
   upon the timer expiry, determining one or more Application ID, in the list of temporary Application IDs, not currently used in any session at the SMF;
   removing the one or more determined Application IDs from the list of temporary Application IDs; and
   unsubscribing, toward the NEF, to PFD data notifications for the one or more determined Application IDs.

2. The method of claim 1, wherein the method comprises configuring the SMF, from an Operation and Maintenance (O&M) entity, with the list of permanent Application IDs for which PFD management applies.

3. The method of claim 2, wherein the method further comprises:
   removing, from the O&M entity, an Application ID from the list of permanent Application IDs; and
   unsubscribing, toward the NEF, to PFD data notifications for the Application ID removed from the list of permanent Application IDs.

4. The method of claim 3, wherein the method further comprises removing, toward a User Plane Function (UPF), the PFD data for the Application ID removed from the list of permanent Application IDs.

5. The method of claim 2, wherein the method further comprises:
configuring the SMF, from the O&M entity, with an Application ID from the list of temporary Application IDs as a permanent Application ID;
adding the Application ID to the list of permanent Application IDs; and
removing the Application ID from the list of temporary Application IDs.

6. The method of claim 1, wherein the method further comprises:
retrieving, from the NEF, PFD data for each Application ID in the list of permanent Application IDs; and
transmitting, toward a User Plane Function (UPF) the PFD data for each Application ID in the list of permanent Application IDs.

7. The method of claim 1, wherein the method further comprises:
retrieving, from the NEF, PFD data for the specified Application ID in the list of temporary Application IDs; and
transmitting, toward a User Plane Function (UPF) the PFD data for the specified Application ID in the list of temporary Application IDs.

8. The method of claim 7, wherein upon the timer expiry, the method further comprises requesting, toward the UPF, removal of PFD data for the one or more determined Application IDs.

9. The method of claim 1, wherein upon the timer expiry, the method further comprises resetting the timer to continue checking periodically the Application IDs.

10. A Session Management Function (SMF) node configured to optimize Packet Flow Description (PFD) management updates in a telecommunication network, wherein the SMF node further is configured to:
set a timer to check periodically Application IDs;
subscribe, toward a Network Exposure Function (NEF) via transmitter, to PFD data notifications for Application IDs in a list of permanent Application IDs for which PFD management applies;
receive, from a Policy Control Function (PCF) via receiver, a control rule specifying an Application ID, wherein the specified Application ID is not included in the list of permanent Application IDs;
add the specified Application ID to a list of temporary Application IDs for which PFD management applies;
subscribe, toward the NEF via the transmitter, to PFD data notifications for the specified Application ID in the list of temporary Application IDs;
upon the timer expiry, determine one or more Application ID, in the list of temporary Application IDs, not currently used in any session at the SMF node;
remove the one or more determined Application IDs from the list of temporary Application IDs; and
unsubscribe, toward the NEF via the transmitter, to PFD data notifications for the one or more determined Application IDs.

11. The SMF node of claim 10, wherein the SMF node further is configured, from an Operation and Maintenance (O&M) entity, with the list of permanent Application IDs for which PFD management applies.

12. The SMF node of claim 11, wherein the SMF node further is configured to:
remove from the O&M entity via the receiver, an Application ID from the list of permanent Application IDs; and
unsubscribe, toward the NEF via the transmitter, to PFD data notifications for the Application ID removed from the list of permanent Application IDs.

13. The SMF node of claim 12, wherein the SMF node further is configured to remove, toward a User Plane Function (UPF) via the transmitter, the PFD data for the Application ID removed from the list of permanent Application IDs.

14. The SMF node of claim 11, wherein the SMF node further is configured:
from the O&M entity via the receiver, with an Application ID from the list of temporary Application IDs as a permanent Application ID;
to add the Application ID to the list of permanent Application IDs; and
to remove the Application ID from the list of temporary Application IDs.

15. The SMF node of claim 10, wherein the SMF node further is configured to:
retrieve, from the NEF via the receiver, PFD data for each Application ID in the list of permanent Application IDs; and
transmit, toward a User Plane Function (UPF) via the transmitter, the PFD data for each Application ID in the list of permanent Application IDs.

16. The SMF node of claim 10, wherein the SMF node further is configured to:
retrieve, from the NEF via the receiver, PFD data for the specified Application ID in the list of temporary Application IDs; and
transmit, toward a User Plane Function (UPF) via the transmitter, the PFD data for the specified Application ID in the list of temporary Application IDs.

17. The SMF node of claim 16, wherein upon the timer expiry, the SMF node further is configured to request, toward the UPF via the transmitter, removal of PFD data for the one or more determined Application IDs.

18. The SMF node of claim 10, wherein upon the timer expiry, the SMF node further is configured to reset the timer to continue checking periodically the Application IDs.

19. A method of optimizing Packet Flow Description (PFD) management updates in a telecommunication network, the method carried out at a Network Exposure Function (NEF) and comprising:
receiving, from a Session Management Function (SMF) a subscription to PFD data notifications for Application IDs for which PFD management applies;
receiving, from a content provider, a PFD management update for one or more Application IDs along with an allowed delay for each Application ID, wherein at least one Application ID amongst the one or more Application IDs has been subscribed by the SMF to PFD data notifications for the Application ID;
determining, for the at least one Application ID and based on its allowed delay, whether a notification has to be performed immediately or can be delayed within the allowed delay;
where it is determined that the notification has to be performed immediately, transmitting, toward the SMF, PFD data for the at least one Application ID; and
where it is determined that the notification can be delayed, scheduling a maintenance delay for notification within the allowed delay and, upon expiry of this maintenance delay, transmitting, toward the SMF, PFD data for the at least one Application ID.

20. A Network Exposure Function (NEF) node configured to optimize Packet Flow Description (PFD) management updates in a telecommunication network, wherein the NEF node further is configured to:
- receive, from a Session Management Function (SMF) via receiver, a subscription to PFD data notifications for Application IDs for which PFD management applies;
- receive, from a content provider via the receiver, a PFD management update for one or more Application IDs along with an allowed delay for each Application ID, wherein at least one Application ID amongst the one or more Application IDs has been subscribed by the SMF to PFD data notifications for the Application ID;
- determine, for the at least one Application ID and based on its allowed delay, whether a notification has to be performed immediately or can be delayed within the allowed delay;
- where it is determined that the notification has to be performed immediately, transmit, toward the SMF via transmitter, PFD data for the at least one Application ID; and
- where it is determined that the notification can be delayed, schedule a maintenance delay for notification within the allowed delay and, upon expiry of this maintenance delay, transmit, toward the SMF via transmitter, PFD data for the at least one Application ID.

* * * * *